United States Patent Office 3,062,858
Patented Nov. 6, 1962

3,062,858
PROCESS FOR PREPARING PARTIAL ESTERS
OF PYROPHOSPHORIC ACID
Friedrich D. Cramer, Heinrichstr. 226, Darmstadt-Eberstadt, Germany, and Manfred G. Winter, Leninstr. 64, Griesheim, near Darmstadt, Germany
No Drawing. Filed Apr. 12, 1960, Ser. No. 21,597
Claims priority, application Germany Apr. 21, 1959
5 Claims. (Cl. 260—461)

This invention relates to a process for the preparation of anhydrides of partial esters of phosphoric acids—that is, partial esters of pyrophosphoric acid. A special feature of the process is the provision as intermediates of anhydrides of phosphoric acid, its partial esters or salts, and carbamic acids—that is, carbamyl phosphates—having additional, independent value.

As is shown in such art as Kosolapoff, United States Patent No. 2,486,658, anhydrides of neutral esters of phosphoric acids are of substantial interest as insecticides. It has been found that the anhydrides of partial esters of phosphoric acids also are insecticidally active, as are the salts of such anhydrides. It has also been found that such anhydrides of partial esters of phosphoric acids and their salts are active as bactericides and fungicides. Further, as is set out in the article by Khorana and Todd, 1953, Journal of the Chemical Society (London), pages 2257–2260, the anhydrides are effective starting materials in the preparation of nucleotide coenzymes. These authors point out that it is desirable to have available as wide a range of methods for preparing such anhydrides as possible. There are a variety of nucleotide coenzymes, so that a corresponding variety of anhydrides should be available for synthesis of the coenzymes.

As is shown in such art as Whetstone, United States Patent No. 2,648,696, acid anhydrides of neutral esters of phosphoric acids and carbamic acids are of substantial interest as insecticides, for other biocidal uses, and as additives for gasolines and other fuels for internal combustion motors, as additives for lubricating oils and greases, and as intermediates in organic syntheses. It has been found that the anhydrides of phosphoric acid and its partial esters and salts, and carbamic acids have similar utility.

We have discovered that the partial esters of pyrophosphoric acid can be prepared by commingling and thereby effecting reaction between (a) an anhydride of a partial ester or salt of phosphoric acid and a carbamic acid—i.e., a carbamyl phosphate—and (b) a partial (mono)ester of phosphoric acid. We have found that the reaction proceeds according to the equation:

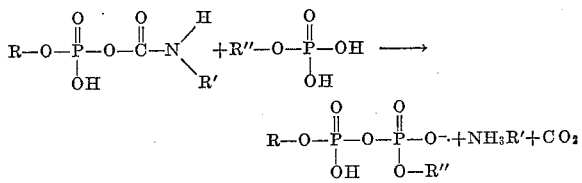

wherein R, R' and R'' are radicals whose character will be described in detail hereinafter. Preferably the carbamyl phosphate is in the form of a salt-forming material, B, in the form of the ion, B⁺.

In view of this discovery, we have investigated the preparation of carbamyl phosphates by reaction of esters of phosphoric acid with isocyanates, the preparation of anhydrides of carboxylic acids and carbamic acids by reaction of the acids and isocyanates or isothiocyanates being well known. For example, we have attempted the preparation of the anhydride of diphenyl phosphoric acid and phenyl carbamic acid, and the anhydride of dibenzyl phosphoric acid and phenyl carbamic acid, by reacting phenyl isocyanate with diphenyl phosphoric acid and dibenzyl phosphoric acid, respectively. We found that the reactions could not be controlled to give the desired anhydrides, for when, in both cases, the temperature of the reaction mixture was raised to the level where reaction would occur, an extremely violent reaction occurred— even though a solvent was used in an attempt to moderate the reaction—and the product was a very dark brown syrup containing substantially none of the desired anhydride. We have found that carbamyl phosphates cannot be prepared by reaction of phosphoric acid or esters thereof, with isocyanates.

We have discovered, however, that carbamyl phosphates can be prepared from phosphoric acid or partial esters thereof by reacting an isocyanate (isothiocyanate) with phosphoric acid, or a mono-ester thereof, which contains at least one hydroxy group as such bonded to phosphorus and at least one hydroxy group which is in the form of a salt with a salt-forming material, B⁺ bonded to phosphorus. In this case, the carbamyl phosphate is formed according to the reaction:

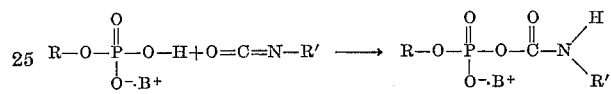

The acid can be sprung from the salt, if desired, by usual methods, or as will be pointed out in more detail hereinafter, the salt can be used directly in the preparation of the anhydrides of partial esters of phosphoric acid.

Consequently, we have discovered an efficient, flexible process for the preparation of anhydrides of partial esters of phosphoric acids. That process comprises the steps of reacting an isocyanate (inclusive of isothiocyanates) with a phosphoric acid compound of the class consisting of phosphoric acid and monoesters thereof, and containing at least one hydroxy group as such bonded to phosphorus, and at least one hydroxy group which is in the form of a salt, bonded to phosphorus, to form the anhydride of that phosphoric acid compound with the carbamic acid corresponding to the isocyanate, then reacting that anhydride with a monoester of phosphoric acid, or a salt thereof, to form the desired anhydride of the partial ester of the phosphoric acid compound and the monoester of phosphoric acid.

This process has several substantial advantages: the reactions are all carried out under mild conditions to give high conversions of the reactants and high yields of the desired products. The intermediate anhydride of the phosphoric acid salt and the carbamic acid—the carbamyl phosphate—itself has useful properties other than as a raw material for the preparation of the anhydride of partial esters of phosphoric acid. In the preferred practice of the process, the phosphoric acid compound used as starting material is in the form of a salt, and the resulting carbamyl phosphate intermediate also is in the form of a salt, which is preferred as the starting material for reaction with the phosphoric acid ester in the second step of the process. The new process lends itself admirably to the preparation of anhydrides of partial esters of phosphoric acid—i.e., pyrophosphates—which are not symmetrical, and in which there may be but one ester group, or in which there are two ester groups, one bonded to one of the phosphorus atoms, and a different one bonded to the other of the phosphorus atoms. It thus is evident that we have discovered an efficient, flexible process for preparing a wide variety of useful anhydrides.

Describing our new process in more detail:
First, an isocyanate or isothiocyanate is reacted with a phosphoric acid compound which has at least one of the hydroxy groups of the phosphoric acid in salt linkage with a salt-forming material, B, and in which one of the hydroxy groups of the phosphoric acid is present as such. The remaining hydroxy group of the phosphoric acid can be a free hydroxy group, it can be in ester linkage, or it can be in salt linkage.

The suitable isocyanate reactants can be described by the formula:

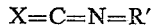

wherein X represents oxygen or sulfur and R' is hydrocarbon or substituted hydrocarbon. The isocyanates (X is oxygen) are preferred. Where the carbamyl phosphate product is to be used as such for a purpose other than the preparation of the anhydride of partial esters of phosphoric acid, the group R' is chosen to give the properties—insecticidal, or other biocidal, properties, solubility characteristics, surface modification characteristics or the like—which are desired. In such a case, the group R' can suitably be alkyl, aryl, alkaryl, aralkyl, alkenyl, cycloalkyl, or mixtures of structural groupings, or can suitably be such groupings modified by one or more hydrocarbon or non-hydrocarbon substituent groups. Preferably the group R' is free from acetylenic unsaturation. Of particular interest are such groups substituted by one or more substituent groups such as halogen, nitro, alkoxy, and carboalkoxy. Of most interest are the compounds wherein R' contains not more than about 20 carbon atoms. Typical examples of the group represented by the symbol R' are: the alkyl groups, both straight-chain and branched-chain in configuration, such as the methyl, ethyl, propyl, isopropyl, n-, sec- and tert-butyl groups, the isomeric $C_5$-, $C_6$, $C_8$ and like alkyl groups, alkenyl groups such as the vinyl, allyl, and crotyl groups, aryl groups such as the phenyl and naphthyl groups, aralkyl groups such as the benzyl, and phenethyl groups, alkaryl groups, such as the tolyl, xylyl, ethylphenyl, and p-diisopropylphenyl groups, cycloalkyl groups such as the cyclohexyl, cyclopentyl, methylcyclopentyl groups, and the like, halogenated groups such as the chloro-, dichloro- and trichloromethyl groups, 1- and 2-chloroethyl groups, 1,1-, 1,2- and 2,2-dichloroethyl groups, halogenated propyl, butyl and hexyl groups, the isomeric chloro and dichlorophenyl groups, nitrophenyl groups, and the like. Where the carbamyl phosphate is to be used in the second stage of our new process, to prepare the anhydride of the partial ester of phosphoric acid, it is preferred that the group R' be a low molecular weight hydrocarbon group free from olefinic and acetylenic unsaturation—i.e., an alkyl, aryl, alkaryl, aralkyl, or cycloalkyl group of up to about 10 carbon atoms.

Suitable isocyanates thus include, for example, phenyl isocyanate, benzyl isocyanate, phenethyl isocyanate, tolyl isocyanate, methyl-, ethyl-, n- and isopropyl isocyanates, monochloromethyl isocyanate, 1,1-dichloroethyl isocyanate, p-chlorophenyl isocyanate, 3,4-dichlorophenyl isocyanate, and the corresponding isothiocyanates.

The suitable phosphoric acid compounds contain one hydroxy group as such bonded to phosphorus, and at least one hydroxy group in salt linkage bonded to phosphorus. The other hydroxy group bonded to phosphorus may be a hydroxy group as such, an esterified hydroxy group, or a hydroxy group in salt linkage. Represented by formula, the suitable phosphoric acid compounds are these:

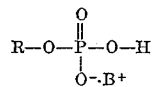

wherein $B^+$ is the ion of a salt-forming material, B, and R is hydrogen, $B^+$, or organic radical.

In these phosphate salts, the organic group represented by the symbol R suitably can be hydrocarbon or substituted hydrocarbon in character or it can be non-hydrocarbon in character. The group can be aliphatic, aromatic, of mixed configuration, or heterocyclic. The group R thus can be an aliphatic hydrocarbon group, or a substituted hydrocarbon group, of straight-chain or branched-chain configuration, or it can be of cyclic configuration. It can be saturated, or mono- or polyolefinically unsaturated; preferably it is free from acetylenic unsaturation. The group R also can be an aromatic group, an aromatically substituted aliphatic group, or an aliphatically substituted aromatic group. Preferred substituents are the hydroxy, aliphaticoxy, nitro, mercapto, and amino— preferably mono- and di-(lower alkyl) amino—radicals, and the halogen atoms. Suitable groups represented by R are the alkyl groups, such as the methyl, ethyl, n- and isopropyl, the n-, sec- and tert-butyl groups, and the various isomeric $C_6$, $C_8$, $C_{10}$ and like groups, the corresponding olefinically unsaturated groups, such as the corresponding alkenyl and alkadienyl groups, including the vinyl, allyl, crotyl, butadienyl and pentadienyl groups, aromatic groups such as the phenyl group, mono- and poly-alkyl-substituted phenyl groups, the biphenyl group, the naphthyl groups, anthryl groups, and the like, aromatically substituted aliphatic groups, such as the aralkyl groups, including the benzyl and phenethyl groups, the phenylvinyl, cinnamyl group and like aralkenyl groups, the cycloalkyl groups, including the cyclopentyl and cyclohexyl groups, the cycloalkenyl and cycloalkadienyl groups, such as the cyclohexenyl and cyclopentadienyl groups. Suitable substituted hydrocarbon groups include the aminoaryl groups, such as the aminophenyl groups, mono- and dialkyl-aminophenyl groups, halophenyl groups, such as the 4-chlorophenyl group, the 2,4,5-trichlorophenyl group, nitrophenyl groups, such groups as the 4-chloro-3-nitrophenyl group, the 3-chloro-4-nitrophenyl group, the 2-chloro-4-nitrophenyl group, their bromo analogs, the pentachlorophenyl group, the 4-chloro-3-methylphenyl group, alkoxyphenyl groups, such as the 4-hydroxymethylphenyl group, its 4-hydroxyalkyl analogs and its hydroxymethyl analogs, the corresponding substituted aralkyl groups, such as the 3,4-dichlorobenzyl group, and the like, halogen-substituted alkyl groups, such as the trichloromethyl group, the omega-chloroalkyl groups, such as the 2-chloroethyl, the 3-chloropropyl groups, and the like, hydroxy-substituted alkyl groups such as the 2-hydroxyethyl group, amino-substituted alkyl groups such as the 2-aminoethyl group, and more complicated groups, such as the pantothenyl group, the 1,2-diphenylhydrazino group, the pyridine N-oxide group, the adenosine group, the riboflavin group, the nicotinic acid amide riboside group, the choline group, the serine group, the inositol group, the tetraacetyl glucosyl group, the spingosine group, the arbutin group, the guanine riboside group, and heterocyclic groups, such as the furfuryl group, the pyridyl group, the pyrimidyl group, and the like.

The salt-forming material, B, present as the ion $B^+$, is also chosen to provide the desired biological property of the intermediate or the final product of the process of this invention, or it may be chosen to provide desired physical characteristics enabling convenient recovery of the intermediate or the final product, or it may be chosen to provide a combination of biological and physical characteristics. The salt-forming material suitably may be a metal, as its ion. The metal ion may be that of an alkali metal, of an alkaline earth metal, or of a transition metal. The salt-forming ion may be a sulfonium ion, such as the trimethylsulfonium ion, or the like; it may be the ammonium ion or a quaternary ammonium ion; it may be a phosphonium ion. The salt-forming material may be an amine, suitably a primary, secondary or tertiary amine. For the preparation of the anhydrides of partial esters of phosphoric acid in the second step of the process of this invention, the tertiary amine salts are preferred, since the corresponding salts of carbamyl phosphates are crystalline compounds which are quite stable in the absence of moisture, and which hydrolyze but slowly in aqueous solution. Of the tertiary amines, the trialkyl amines wherein each of the alkyl groups contains not more than eight carbon atoms are preferred. In these amines, the three alkyl groups can be the same, or different, and of the same or different configuration.

When the unesterified phosphoric acid salt is used (R is hydrogen), the phosphate salt can react with two moles of the isocyanate to form the di(carbamyl)phosphate, according to the equation

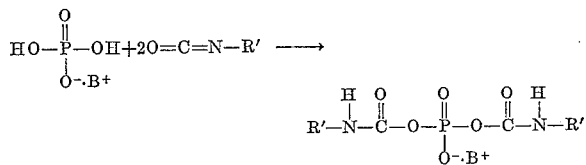

If desired, two of the hydroxyl groups can be bonded in salt linkage.

The preparation of the carbamyl phosphates is accomplished by mixing the acid phosphate salt and the isocyanate and subjecting the mixture to mildly elevated temperatures. The phosphate salt is readily formed by the usual methods—normally by reacting the salt-forming material M with the acid phosphate. The reaction of the phosphate salt and the isocyanate ordinarily is conducted at a temperature below about 100° C. to avoid decomposition of the product. Since the reaction proceeds readily at about 80° C., and such temperatures insure that decomposition of the product will not occur, it is preferred to employ a reaction temperature below about 80° C. Reaction temperatures of at least about 25° C. are required to obtain practical reaction rates.

In the usual case, about the stoichiometric amounts of the phosphate salt and isocyanate are used. A moderate excess—up to about 100%—of either may be used in a given case to insure complete conversion of the slower reacting material.

If desired, a solvent may be used. The solvent chosen should be one in which the reactants are substantially soluble but in which the carbonyl phosphate product is substantially insoluble. The preferred solvents are those having high dielectric constants, typical solvents of this class being pyridine, acetonitrile, formamide, dimethylformamide, sulfolane, nitromethane, and dimethylsulfoxide.

The carbamyl phosphate ordinarily crystallizes from the reaction mixture and is recovered by decantation, filtration or other usual methods for separating solids from liquids. After the reaction is complete, the reaction mixture may be cooled to improve separation of the crystalline product. The carbamyl phosphate ordinarily is best purified, if necessary, by recrystallization techniques, since distillation of the carbamyl phosphate would involve the use of very high vacuum to avoid temperatures above about 80° C.

The following examples illustrate the preparation of typical carbamyl phosphates by the process of this invention. In these examples, "parts" means parts by weight unless otherwise expressly stated, and parts by weight bear the same relationship to parts by volume as does the kilogram to the liter.

EXAMPLE I

The carbamyl phosphates shown in Table I were produced by reacting the appropriate isocyanate with the triethyl ammonium salt of the monophenyl ester of phosphoric acid. In each case, an approximately equimolar amount of the isocyanate was slowly added and mixed with the salt. Heat was evolved, and the carbamyl phosphate product crystallized out. To complete the separation, in some cases the reaction mixture was cooled at −20° C. for some time after the reaction was complete.

*Table I*

| Isocyanate | Product (B=$^+$NH(C$_2$H$_5$)$_3$) | Yield, percent |
|---|---|---|
| C$_4$H$_9$N=C=O | C$_6$H$_5$—O—P(=O)(O$^-$·B$^+$)—O—C(=O)—NH—C$_4$H$_9$ | 90 |
| CH$_3$—O—C$_6$H$_4$N=C=O | C$_6$H$_5$—O—P(=O)(O$^-$·B$^+$)—O—C(=O)—NH—C$_6$H$_4$—O—CH$_3$ | 60 |
| C$_2$H$_5$—O—C$_6$H$_4$N=C=O | C$_6$H$_5$—O—P(=O)(O$^-$·B$^+$)—O—C(=O)—NH—C$_6$H$_4$—O—CH$_2$—CH$_3$ | 81 |
| C$_6$H$_5$N=C=O | C$_6$H$_5$—O—P(=O)(O$^-$·B$^+$)—O—C(=O)—NH—C$_6$H$_5$ | 74 |
| O$_2$N—C$_6$H$_4$N=C=O | C$_6$H$_5$—O—P(=O)(O$^-$·B$^+$)—O—C(=O)—NH—C$_6$H$_4$—NO$_2$ | 56 |

EXAMPLE II

Production of the triethyl ammonium salt of N-n-butyl-carbamyl-O-p-chlorophenyl phosphate according to the equation

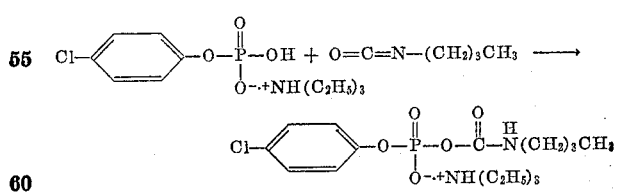

Starting materials:
  10.43 parts of p-chlorophenyl phosphoric acid
  5.05 parts of triethylamine
  4.95 parts of n-butyl isocyanate
  20.00 parts by volume of acetonitrile The components were mixed, the temperature of the mixture rising to approximately 60–70° C. when the isocyanate was added, the reaction solution turning light yellow. The mixed anhydride crystallized out into fine colorless crystals after 15–20 minutes. To complete the separation the flask was cooled at −20° C. for some time. The reaction mixture then was filtered and the residue washed several times with ether. If necessary, the residue may be washed with cold acetonitrile or recrystallized from benzene. The material was thoroughly dried over sulfuric acid and phosphorus pentoxide. Melting point 93° C.

Yield.—15.2 parts (74.5% of theory).

Analysis.—Calculated: N=6.85%; P=7.60%. Found: N=6.42%; P=7.46%.

EXAMPLE III

Production of triethyl ammonium salt of N-n-butyl-carbamyl-O-monomethyl glycol phosphate according to the equation:

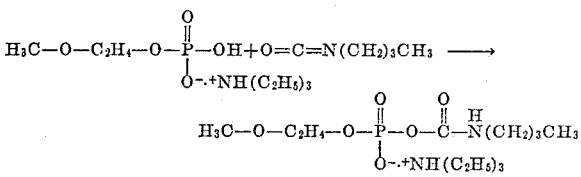

Starting materials:
  7.75 parts of monomethyl glycol phosphoric acid
  5.05 parts of triethylamine
  4.95 parts of n-butyl isocyanate
  10.00 parts by volume of acetonitrile The monomethyl glycol phosphoric acid was, as in the previous experiments, neutralized with triethylamine, 10 parts by volume of acetonitrile added and mixed with the isocyanate after cooling. After some time the solvent and all volatile components were removed under vacuum at a bath temperature of 30° C. The remaining syrupy mass was the mixed anhydride.

Yield.—15.1 parts (85% of theory).

Analysis.—Calculated: N=7.86%; P=8.71%. Found: N=7.66%; P=8.74%.

EXAMPLE IV

Production of the triethyl ammonium salt of N-n-butyl-carbamyl-O-β,α-1,2,3,4-tetraacetyl glucose - 6 - phosphates (TAG phosphates) according to the equation:

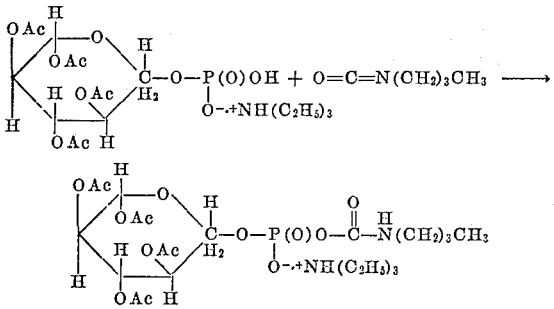

Starting materials:
  4.28 parts of TAG-6-phosphoric acid
  1.01 parts of triethylamine
  0.99 part of n-butyl isocyanate
  10.00 parts by volume of acetonitrile The experimental arrangement was similar to the previous experiments of this kind. About 30–40 minutes after the components had been combined the volatile components were carefully removed in vacuo at a bath temperature of 30° C. The remaining syrupy mass is identical with the mixed anhydride.

EXAMPLE V

Production of triethyl ammonium salt of N-n-butyl-carbamyl-O-adenosin-5'-phosphates according to the equation:

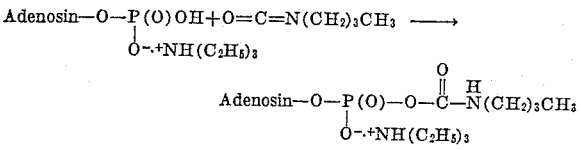

Starting materials:
  0.347 part of adenosin-5' acid phosphate (AMP)
  0.101 part of triethylamine
  0.099 part of n-butyl isocyanate
  25.00 parts by volume of pyridine
  10.00 parts by volume of formamide The AMP was dissolved in the pyridine/formamide mixture. The triethylamine and the n-butyl isocyanate were then successively added and the mixture left to stand for two hours at room temperature. The pyridine/formamide mixture was then held under high vacuum at a bath temperature of 40° C. and the residue chromatographically examined.

The following examples relate to the conversion of unesterified phosphoric acid salts with isocyanates.

EXAMPLE VI

Production of the monotriethylammonium salt of N-n-butyl-carbamyl phosphates.

Starting materials:
  49.0 parts of phosphoric acid of 100% concentration
  101.0 parts of triethylamine
  49.5 parts of n-butyl isocyanate
  80 parts by volume of acetonitrile The experimental arrangement in this case is also identical with the previous experiments. When the reactants were mixed and the temperature was completed (as shown by the decrease in temperature), 500–600 parts by volume of ether were gradually added, the mixture being cooled to between −15° C. and −20° C. When the syrupy mass had solidified, it was separated by suction and the syrupy mass remaining in the filter washed with ether.

After drying over sulfuric acid and phosphorus pentoxide, the material was pulverized and digested in ether, filtered and thoroughly dried again.

Yield.—55.0 parts (37.0% of theory).

Analysis.—Calculated: N=9.40%; P=10.41%. Found: N=9.26%; P=10.59%.

Although the orthophosphoric acid was neutralized with two moles of base, a compound was obtained of which the second OH-group of the molecule was not neutralized. This was probably due to the fact that the phosphoric acid used was dehydrated by heating at 250° C. and contained some di-, tri- and still further condensed phosphoric acids. In their second and third dissociation stages the latter acids are more concentrated and may expel the second hydroxyl group of the monophosphoric acid from their salts.

This is confirmed by the following reaction:

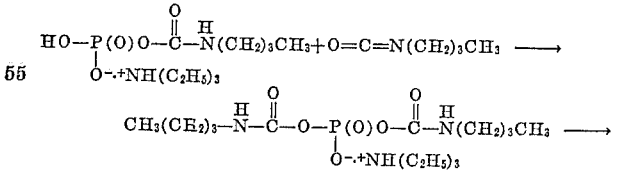

Starting materials:
  14.90 parts of N-n-butyl-carbamyl phosphate
  4.95 parts of n-butyl isocyanate
  15.00 parts by volume of acetonitrile The anhydride was dissolved in the acetonitrile with the exclusion of moisture and immediately mixed with the required quantity of isocyanate, after which the mixture was kept in an incubator for 30 minutes. After the mixture had been left to stand for 24 hours at room temperature, 150 parts by volume of ether were added and the mixture crystallized at −20° C. On completion of crystallization the product was separated by suction and dried in a desiccator over phosphorus pentoxide.

Yield.—13.6 parts (68.5% of theory).

Analysis.—Calculated: N=10.58%; P=7.81%. Found: N=10.75%; P=8.45%.

EXAMPLE VII

Production of the potassium salt of N-n-butyl-carbamyl-O-phenyl phosphates.

Starting materials:
- 6.9 parts of potassium carbonate
- 17.4 parts of monophenyl phosphoric acid
- 9.9 parts of n-butyl isocyanate
- 25.00 parts by volume of acetonitrile
- 10.00 parts by volume of water The monophenyl phosphoric acid and potassium carbonate were dissolved in the acetonitrile-water mixture while heating for a fairly long period. When all reactants had been dissolved the corresponding quantity of isocyanate was added. The solution then was heated to 60–70° C. After cooling, 200 parts by volume of acetone were gradually added; fine, colorless needles precipitated which were filtered off and dried over phosphorus pentoxide.

*Yield.*—10.0 parts (32.0% of theory).

*Analysis.*—Calculated: N=4.5%; P=9.96%. Found: N=3.70%; P=9.98%.

According to this invention, the carbamyl phosphate can be converted to the anhydride of a partial ester of phosphoric acid by mixing, and thereby effecting reaction between the salt of the carbamyl phosphate and a partial ester of phosphoric acid. This partial ester can be resented by the formula:

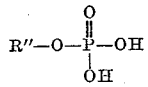

wherein R″ is an organic group of the kind represented by the symbol, R, as hereinbefore set out.

The reaction proceeds according to the equation:

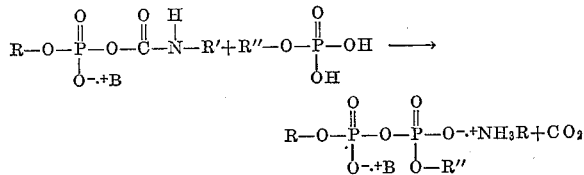

Where a di(carbamyl)phosphate is used—R is a carbamyl group—the final product can be represented by the formula.

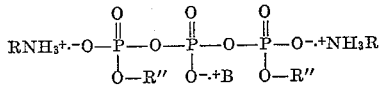

The acid can be sprung from the salt, or the salt can be recovered and converted to a different salt, and ester, or other derivative, as may be desirable.

In the process of the invention, the phosphoric acid ester which can be used in the preparation of the carbamyl phosphates can be the same as the ester reacted with the carbamyl phosphates—the anhydrides being symmetric—or the two acid esters can be different—the anhydrides being asymmetric.

The reaction of the carbamyl phosphate and the phosphoric acid ester is conducted by simply mixing the two materials and allowing them to react. The reaction will go forward at reasonable rates at about room temperature, or if desired, somewhat higher or lower temperatures—say from about 10° C. to about 80° C.—can be used. In most cases, it is desirable that the temperature used not exceed about 50° C., since at this temperature the reaction proceeds at a rapid rate and the problem of decomposition of heat-sensitive products is avoided.

The reaction of the carbamyl phosphate and the phosphate ester is otherwise conducted in the same manner as the reaction of the isocyanate and the phosphate salt. That is, about stoichiometric amounts of the two reactants are ordinarily used, although the use of a moderate excess of either reactant may be desirable in any given case. A solvent ordinarily will be found to be desirable. The high dielectric constant liquids are also suitable for this purpose. The anhydride product is most conveniently recovered by crystallization techniques. Preferably, substantially all moisture is excluded from the reaction mixture, because many of the anhydride products tend to hydrolyze readily.

The anhydrides are best isolated by precipitating them in the form of their metal salts, preferably their lithium salts, since in this form they are very stable compounds readily crystallized from high dielectric constant liquids. The lithium salts can be converted to other salts by usual techniques, methathesis involving solubility differences ordinarily being the most convenient technique.

The following examples illustrate the preparation of typical anhydrides of partial esters of phosphoric acid, according to the process of this invention. In these examples, "parts" means parts by weight unless otherwise expressly stated, and parts by weight bear the same relationship to parts by volume as does the kilogram to the liter.

EXAMPLE VIII

Preparation of the dilithium salt of the symmetric diphenylpyrophosphoric acid according to the equation:

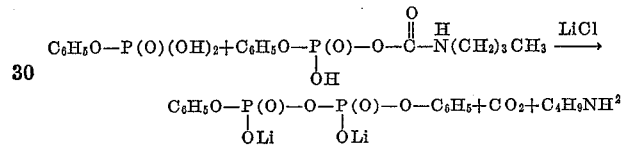

Starting material:
- 18.75 parts N-n-butyl-carbamyl-O-phenylphosphate
- 8.70 parts monophenyl phosphoric acid (MPhPS)
- 20.00 parts by volume pyridine
- 25.00 parts by volume acetonitrile The MPhPS was dissolved in the pyridine-acetonitrile mixture. The anhydride was then also added, and the mixture vigorously shaken. The reaction mixture was then left to stand in an incubator for 18–20 hours at a temperature of about 40° C. After completion of the reaction the solution was allowed to cool and subsequently the aqueous solution of 4.34 parts of lithium chloride in 15 parts by volume of water was added and the mixture thoroughly stirred. After some time the solution was filtered. The residue was washed several times with a hot 50:50 alcohol-acetone mixture and digested. When all ammonium salts had been removed in this way, the residue was dried under vacuum. The fine, colorless crystalline substance was dried in the desiccator over sulfuric acid and calcium chloride.

*Yield.*—14.0 parts (80% of theory).

*Analysis.* — Calculated: P=17.22%; C=40.00%; H=3.34%. Found: P=17.27%; C=39.80%; H=3.36%.

The substance crystallizes out with one mol water. With the use of 95% pyridine and acetonitrile the yield was 75.7% of theory.

The dicyclohexyl ammonium salt and the barium salt were prepared from the lithium salt of the symmetrical diphenylpyrophosphoric acid.

Dicyclohexyl ammonium salt:
Starting material—
- 1.200 parts dilithium-symmetric diphenylpyrophosphate
- 2.000 parts cyclohexylamine The lithium salt was dissolved in 20–30 parts by volume of water, after which the amine was added, whereupon a thick white precipitate was immediately formed, which was filtered off and recrystallized from water to which some HCl had been added. The substance was dried in a desiccator over sulfuric acid and phosphorus pentoxide.

Melting point 253° C. Melts with decomposition.
Yield.—1.26 grams (95.7% of theory).
Analysis. — Calculated: N=5.32%; P=11.75%; C=54.60%; H=7.18%. Found: N=5.35%, P=11.55%; C=54.36%; H=7.31%.

Barium salt:
Starting material—
  1.200 parts dilithium-diphenylpyrophosphate (symmetric)
  1.000 parts barium acetate The lithium salt was dissolved in 20–30 parts by volume of water and the barium acetate, likewise dissolved in 20 parts by volume of water, was added. A colorless, fine crystalline deposit immediately precipitated. This deposit was filtered off and the residue is washed several times with a large amount of water.

Yield.—1.20 parts (95.5% of theory).
Analysis.—Calculated: P=12.38%; C=28.79%; H=2.78%. Found: P=12.38%; C=28.84%; H=3.02%.
The product crystallizes out with 2 moles water.

EXAMPLE IX

Preparation of the dilithium salt of the symmetric di-p-chlorophenyl-pyrophosphoric acid according to:

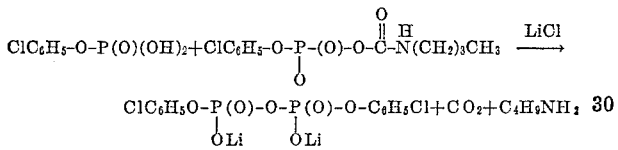

Starting material:
  20.43 parts N-n-butyl-carbamyl-O-p-chlorophenyl-phosphate
  10.43 parts p-chlorophenyl phosphoric acid
  20.00 parts by volume pyridine
  25.00 parts by volume acetonitrile Experimental arrangement and procedure as in Example VIII. After combining the components, the reaction mixture was left to stand in an incubator for 18–20 hours at a temperature of 40° C. After the addition of 4.34 parts of lithium chloride in 15 parts by volume of water, the mixture was filtered and treated in exactly the same manner as above. After being washed and digested in alcohol/acetone the substance was pure and colorless.

Yield.—11.0 parts (49% of theory).
Analysis.—Calculated: P=14.46%; C=33.58%; H=2.35%; Cl=16.55%. Found: P=14.17%; C=33.61%; H=2.88%; Cl=16.08%.
The substance crystallizes out with one mol water.

EXAMPLE X

Preparation of the dilithium salt of $P^1$-phenyl-$P^2$-p-chlorophenyl-pyrophosphoric acid according to

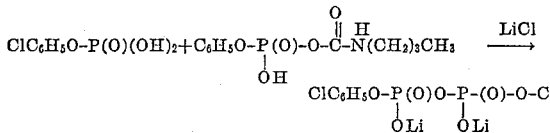

Starting material:
  18.75 parts N-n-butyl-carbamyl-O-phenylphosphate
  10.45 parts p-chlorophenyl phosphoric acid
  20.00 parts by volume pyridine
  25.00 parts by volume acetonitrile Analogous to Example VIII the reaction components were mixed and dissolved and left to stand in an incubator for 18–20 hours at a temperature of 40° C. Thereafter 4.34 parts of lithium chloride dissolved in 15 parts by volume of water were added; the mixture was vigorously stirred and then filtered. As in the previous examples the residue was washed and digested with a 1:1 mixture of alcohol and acetone. When all ammonium salts had been removed, the mixture was dried in a desiccator over sulfuric acid, phosphorus pentoxide and calcium chloride.

Analysis. — Calculated: P=15.72%; C=36.50%; H=2.79%; Cl=9.01%. Found: P=15.47%; C=36.45%; H=3.07%; Cl=8.71%.
The substance crystallizes out with one mol water.

EXAMPLE XI

Preparation of the dilithium salt of $P^1$-phenyl-$P^2$-monomethyl glycolpyrophosphoric acid according to

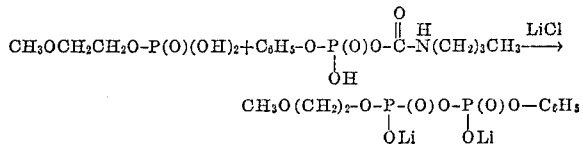

Starting material:
  18.75 parts N-n-butyl-carbamyl-O-phenylphosphate
  7.75 parts monomethylglycol phosphoric acid
  20.00 parts by volume pyridine
  25.00 parts by volume acetonitrile The reaction mixture was left to stand for 20 hours. Thereafter 4.34 grams of lithium chloride in 15 parts by volume of water were added, stirred and filtered, washed and purified with an alcohol/acetone mixture. After the by-products had been removed the residue was extracted several times with a 98% ethanol (each portion: 50 parts by volume) under increased temperature and the product was precipitated with acetone.

Another fraction of the desired pyrophosphate was obtained by adding acetone to the filtrate and freeing the resultant substance from ammonium salts with a 1:2 alcohol-acetone mixture.

Yield.—6.7 parts (39% of theory).
Analysis. — Calculated: P=18.10%; C=31.6%; H = 4.09%. Found: P = 17.91%; C = 33.15%; H=4.49%.
The substance crystallizes out with one mol water.

EXAMPLE XII

Preparation of the $P^1$-β-d-1,2,3,4-tetraacetyl-glucosyl-$P^2$-phenyl pyrophosphate.

First a reaction mixture was prepared as follows: 4.28 parts of β,d,1,2,3,4-tetraacetylglucosyl-6-phosphoric acid (TAG-6-phosphoric acid), 1.01 parts triethylamine, 0.99 part n-butylisocyanate, and 10 parts by volume of acetonitrile were reacted, the components reacting as follows:

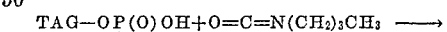
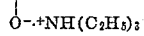
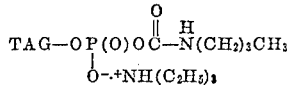

About 30–40 minutes after combining the components, the volatile parts were carefully removed under vacuum at a bath temperature of 30° C. The remaining syrup contained the desired carbamyl phosphate and was immediately reacted with the monophenyl phosphoric acid. Starting material, reaction mixture (anhydride):

1.74 parts MPhPS
  4.00 parts by volume pyridine
  5.00 parts by volume acetonitrile After taking a sample for the chromatographic comparison of the syrup obtained, the anhydride is dissolved in pyridine-acetonitrile and MPhPS added. After the mixture had been in an incubator for 18 hours a chromatogram was made.

Zone 1: Anhydride
Zone 2: Reaction mixture
Zone 3: Tetraacetylglucosyl-6-phosphoric acid
Zone 4: DPhPS+MPhPS

EXAMPLE XIII

Preparation of the trilithium salt of the P¹-phenyl-pyrophosphoric acid

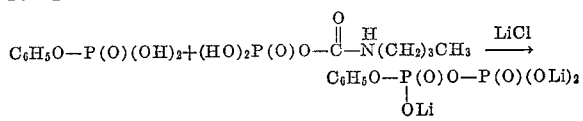

Starting material:
  14.90 parts N-n-butyl carbamyl phosphate
  8.70 parts MPhPS
  20.00 parts by volume pyridine
  25.00 parts by volume acetonitrile The anhydride and the MPhPS were mixed, dissolved in the solvent and left to stand in the incubator for 20 hours at a temperature of 40° C. 6.5 parts of lithium chloride in 20 parts by volume water were then added and the mixture after some time was filtered. The residue was thoroughly purified with an ethanol-acetone mixture and dried in a desiccator over sulfuric acid and phosphorus pentoxide. In this case special importance should be attached to the removal of the ammonium salts.

Yield.—8.5 parts (62.5% of theory).
Analysis. — Calculated: P=21.38%; C=24.80%. Found: P=20.86%; C=24.38%.

The substance crystallizes out with one mol water.

EXAMPLE XIV

Preparation of the P¹-adenosine-5'-pyrophosphate (adenine diphosphate):

Starting material:
  0.0347 part adenosine monophosphate
  0.0298 part N-n-butyl carbamylphosphate
  15.00 parts by volume pyridine+¼ part by volume water The a.m.p. was dissolved in pyridine while adding the water, after which the anhydride was added. Then the reaction mixture was kept in an incubator for 20 hours at 40° C. as described in the foregoing.

After this period a chromatogram was made, which clearly proves the formation of the adenosine diphosphate.

EXAMPLE XV

Conversion of N-n-butyl carbamyl-O-phenylphosphate with diphenylphosphoric acid:

Starting material:
  18.75 parts N-n-butyl carbamyl-O-phenylphosphate
  12.50 parts DPhPS
  7.85 parts dimethylaniline hydrochloride
  20.00 parts by volume pyridine
  25.00 parts by volume acetonitrile The reaction components were dissolved in the solvent and kept in an incubator for 20 hours at 40° C. After the addition of 2.17 parts of lithium chloride in 15 parts by volume of water, 13.0 parts (72% of the theoretical amount) of P¹-phenyl-P²-phenyl pyrophosphate was found. In a somewhat modified experimental procedure the reaction mixture, after having been in an incubator for 20 hours, was immediately evaporated under high vacuum, extracted with ether and the residue worked up according to the conventional methods. In this case also 13.5 parts or 75% of the theoretical amount of diphenyl pyrophosphate was isolated.

No possible tetraphenyl pyrophosphate was found in the ether.

EXAMPLE XVI

Starting material:
  18.75 parts N-n-butyl carbamyl-O-phenylphosphate
  13.90 parts DPhPS
  7.85 parts hydrochloride (dimethylaniline)
  20.00 parts by volume pyridine
  25.00 parts by volume acetonitrile Experimental arrangement and procedure as in Example XV. In this case also it was impossible to obtain the triester; 14.4 parts (80% of the theoretical amount) of the symmetric diphenyl-pyrophosphate was obtained.

While the process to this point has been described in terms of two distinct steps, involving separation of the intermediate carbamyl phosphate, it will be evident that the carbamyl phosphate need not be separated, but the crude reaction mixture containing the carbamyl phosphate can be employed. In such cases, the carbamyl phosphate is first prepared by reaction of the phosphate salt and the isocyanate, then the partial ester of phosphoric acid is added to complete the reaction. In some cases, where the phosphate salt and the partial ester of phosphoric acid are otherwise identical, the partial ester of pyrophosphoric acid can be formed in one step—adding the stoichiometric amount of the phosphate salt required to form the partial ester of pyrophosphoric acid to the reaction mixture containing the isocyanate.

As has already been pointed out herein, carbamyl phosphates and their salts and pyrophosphate anhydrides and their salts prepared by means of the process of this invention are useful as insecticides, bactericides and fungicides. In such uses they may be applied in the form of solutions, emulsions or suspensions in inert liquid diluents, in dust form carried by solid finely divided carrier material, alone or in conjunction with previously known insecticides, germicides, fungicides, etc. When used as systemic poisons the toxicant is applied to or into the ground in the vicinity of the plant, or directly onto the plant, whereupon it is absorbed by the plant rendering the plant as a whole toxic to many pests. Additional uses that come into consideration for products that can be produced by the process of this invention are as additives for gasolines and other fuels for internal combustion engines, additives for oils and greases, and intermediates in organic syntheses. The article by Khorana and Todd, cited hereinbefore, describes suitable methods for using carbamyl phosphates in the preparation of nucleotide coenzymes.

We claim as our invention:

1. A process for the preparation of a partial ester of pyrophosphoric acid of the formula

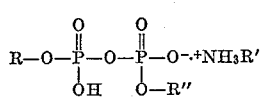

which comprises commingling about stoichiometric amounts of each of (a) a carbamyl phosphate of the formula

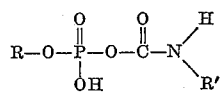

and (b) a partial ester of phosphoric acid of the formula

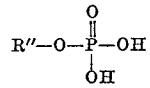

at a temperature of from about 10° C. to about 80° C., wherein R is a member selected from the group consisting of alkyl, aryl, alkaryl, aralkyl, and cycloalkyl, each of up to 14 carbon atoms and said members substituted with from 1 to 3 members selected from the group consisting of hydroxy, lower alkoxy, nitro, mercapto, amino and halo; R' is selected from the group consisting of alkyl, aryl, alkaryl, aralkyl, and cycloalkyl each of up to 10 carbon atoms; and R" is selected from the same group as R.

2. A process for the preparation of a partial ester of pyrophosphoric acid of the formula of claim 1 which comprises commingling about stoichiometric amounts of each of (a) a salt of a carbamyl phosphate of the formula

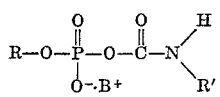

and (*b*) a partial ester of phosphoric acid of the formula of claim 1, at a temperature of from about 10° C. to about 80° C., wherein R is a member selected from the group consisting of alkyl, aryl, alkaryl, aralkyl, and cycloalkyl, each of up to 14 carbon atoms and said members substituted with from 1 to 3 members from the group consisting of hydroxy, lower alkoxy, nitro, mercapto, amino and halo; R' is selected from the group consisting of alkyl, aryl, alkaryl, aralkyl, and cycloalkyl each of up to 10 carbon atoms; and B+ is a salt forming ion selected from the group consisting of alkali metal, alkaline earth metal, sulfonium, ammonium, quaternary ammonium and phosphonium ions.

3. A process for preparing a carbamyl phosphate of claim 1 which comprises reacting about stoichiometric amounts of each of a salt of a phosphoric acid compound of the formula

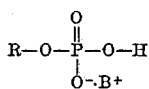

with an isocyanate of the formula $$O=C=N-R'$$

at a temperature below about 100° C., wherein R is a member selected from the group consisting of alkyl, aryl, alkaryl, aralkyl, and cycloalkyl, each of up to 14 carbon atoms and said members substituted with from 1 to 3 members selected from the group consisting of hydroxy, lower alkoxy, nitro, mercapto, amino and halo; R' is selected from the group consisting of alkyl, aryl, alkaryl, aralkyl, and cycloalkyl each of up to 10 carbon atoms; and B+ is a salt forming ion selected from the group consisting of alkali metal, alkaline earth metal, sulfonium, ammonium, quaternary ammonium and phosphonium ions.

4. A process for preparing a carbamyl phosphate of claim 2 which comprises reacting about stoichiometric amounts of each of a salt of a phosphoric acid compound of

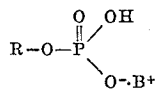

with an isothiocyanate of the formula $$S=C=N-R'$$

at a temperature below about 100° C., wherein R' is selected from the group consisting of alkyl, aryl, alkaryl, aralkyl, and cycloalkyl each of up to 10 carbon atoms.

5. A process for the preparation of a partial ester of pyrophosphoric acid of the formula

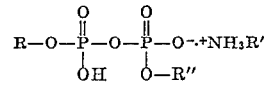

wherein R is a member selected from the group consisting of alkyl, aryl, alkaryl, aralkyl, and cyloalkyl, and each of up to 14 carbon atoms and said members substituted with from 1 to 3 members selected from the group consisting of hydroxy, lower alkoxy, nitro, mercapto, amino and halo; R' is selected from the group consisting of alkyl, aryl, alkaryl, aralkyl, and cycloalkyl each of up to 10 carbon atoms; and R" is selected from the same group as R, which comprises reacting about stoichiometric amounts of each of a salt of a phosphoric acid compound of

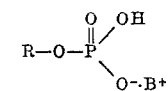

with an isocyanate of claim 3, at a temperature below about 100° C., and reacting about stoichiometric amounts of each of the resulting carbamyl phosphate with a partial ester of phosphoric acid of the formula

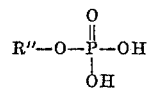

at a temperature of from about 10° C. to about 80° C., wherein R" is a member selected from the group consisting of alkyl, aryl, alkaryl, aralkyl, and cycloalkyl, each of up to 14 carbon atoms and said members substituted with from 1 to 3 members selected from the group consisting of hydroxy, lower alkoxy, nitro, mercapto, amino and halo.

References Cited in the file of this patent

UNITED STATES PATENTS

| | | |
|---|---|---|
| 2,648,696 | Whetstone | Aug. 11, 1953 |
| 2,964,528 | Wicker et al | Dec. 13, 1960 |

FOREIGN PATENTS

| | | |
|---|---|---|
| 335,646 | Switzerland | Mar. 14, 1959 |

OTHER REFERENCES

Arbuzov et al.; Bull. Acad. Sci. U.S.S.R. (Div. of Chem. Sci.) 781–785 (1952).

Tanaka: "J. Biochem. (Tokyo)," vol. 47, No. 2, pp. 207–221 (Feb. 1960).